T. J. FALES.
Steam Engine Boiler and Cylinder.

No. 214,287. Patented April 15, 1879.

Witnesses:
Frank M. Burnham
J. W. Tubman

Inventor:
Thos. J. Fales
by
W. H. Babcock

UNITED STATES PATENT OFFICE

THOMAS J. FALES, OF NEW YORK, N. Y.

IMPROVEMENT IN STEAM-ENGINE BOILER AND CYLINDER.

Specification forming part of Letters Patent No. 214,287, dated April 15, 1879; application filed March 5, 1879.

*To all whom it may concern:*

Be it known that I, THOMAS J. FALES, of the city of New York, in the county of New York and State of New York, have invented certain new and useful Improvements in Steam-Engine Boiler and Cylinder; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention relates more especially to that class of steam-engines in which the cylinder is suspended below, or partly below, the top of an upright boiler; and it consists in providing such boilers with a hot-air chamber or pot, set into the top thereof, the cylinder being suspended and working in said hot-air chamber.

Figure 1:
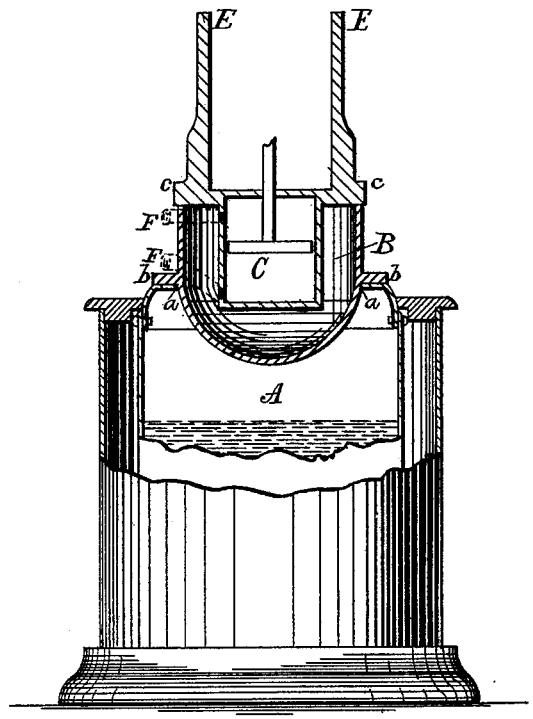
Figure 2:
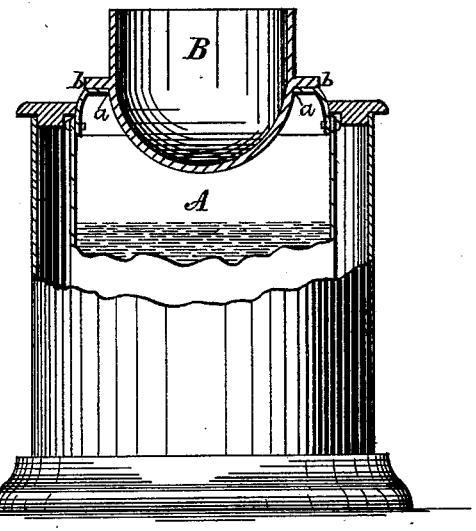

In the accompanying drawings, Figure 1 represents a side elevation, partly in section, of a steam-engine boiler and cylinder provided with my hot-air chamber. Fig. 2 represents a similar view with the cylinder removed.

A designates an upright steam-engine boiler, having a central opening in its top a, to receive a hot-air vessel or chamber, B, shaped somewhat like an ordinary pot used for culinary purposes. This pot is provided, on a line about midway of its height, with an external circumferential flange, b, which rests on the top a of boiler A, surrounding the central opening therein, and prevents vessel B from falling through. Said vessel or pot B is thereby suspended partly within said boiler, and the air within it will be heated by the steam in the latter, though this steam is effectually excluded from the interior of said pot or vessel.

C designates the cylinder of my engine, the upper flange, c, of which forms the cover of the pot or vessel B, and also the base for standards E, supporting the operating-shaft and its attachments. Said cylinder, with its flange and the standards, shaft, and attachments, may be lifted bodily from said vessel or pot and applied to another boiler, or taken apart for repairs, or simply set aside temporarily. After such removal the vessel B may be filled with water and used to boil potatoes or other edible articles. This will often be found a decided convenience for workmen who are operating with a machine at a distance from home. Fig. 2 shows the devices in readiness for this use.

When the cover is on said vessel the interior thereof forms a hot-air chamber, in which cylinder C is suspended and works. The steam is brought to the steam-chest of said cylinder by a pipe or pipes, F, which pass through vessel B, allowing no escape of the steam within the same, and the interior of said vessel has no communication either with the steam in the boiler or the cooler air outside. The cylinder is thus retained in a hot-air bath while the engine is running, and this produces the good effect of superheating the steam in said cylinder without the disadvantages incidental to the steam-chambers heretofore employed for that purpose. The chief of these disadvantages is the application of moisture to the outside of the cylinder, inevitably lowering the temperature of the latter by evaporation, and often injuring its surface by oxidation whenever withdrawn from the boiler or otherwise subjected to the action of the air.

My hot-air chamber keeps the cylinder perfectly dry, and also secures the greatest possible benefit of the expansibility of the steam within said cylinder.

It is obvious that the flange b may be made at or near the rim of the vessel B, so as to suspend the latter entirely within the boiler A. The cylinder C may also be suspended within said vessel by a flange arranged below the top flange, c, so as to suspend the cylinder only partly within said vessel or hot-air chamber. The said vessel B may also be provided with a permanent top having a central opening for the cylinder to pass through, and said cylinder may be suspended in any convenient way.

I am aware that steam-engine cylinders have heretofore been suspended in hot-air chambers or spaces; also, that cylinders have been surrounded by hot-air chambers or spaces, and arranged so that the engine will work therein, and therefore I do not claim such construction, broadly; but,

Having thus fully described my invention, what I claim as new, and desire to secure by Letters Patent, is—

1. The combination, with a boiler and steam-engine cylinder, of a hot-air chamber set into the top of said boiler, the said parts being constructed and arranged in such manner that the engine will work within said hot-air chamber, and the surface of the cylinder will be protected by the same from the steam, substantially as set forth.

2. The combination, with a boiler and steam-engine cyinder, of a hot-air chamber, B, provided with flange b, whereby it is supported partly above and partly within the boiler, the said parts being constructed and arranged in such manner that the engine will work within said hot-air chamber, and will be protected thereby from the steam, said cylinder and its attachments being removable at will, all substantially as and for the purposes set forth.

3. The combination, with an upright boiler, of a hot-air chamber suspended therein, and a cylinder, the upper flange of which forms a cover for said hot-air chamber.

In testimony that I claim the foregoing as my own I affix my signature in presence of two witnesses.

THOMAS JONES FALES.

Witnesses:
H. M. TOWNLEY,
CHAS. H. LEONARD.